(12) United States Patent
Burke et al.

(10) Patent No.: US 9,576,743 B2
(45) Date of Patent: Feb. 21, 2017

(54) SOLID ELECTROLYTIC CAPACITOR WITH INTEGRATED FUSE ASSEMBLY

(71) Applicant: AVX Corporation, Fountain Inn, SC (US)

(72) Inventors: Michael Burke, Kennebunk, ME (US); Daniel Johnson, Waterboro, ME (US)

(73) Assignee: AVX Corporation, Fountain Inn, SC (US)

( * ) Notice: Subject to any disclaimer, the term of this patent is extended or adjusted under 35 U.S.C. 154(b) by 172 days.

(21) Appl. No.: 14/370,988

(22) PCT Filed: Jan. 11, 2013

(86) PCT No.: PCT/US2013/021160
§ 371 (c)(1),
(2) Date: Jul. 8, 2014

(87) PCT Pub. No.: WO2013/106659
PCT Pub. Date: Jul. 18, 2013

(65) Prior Publication Data
US 2016/0005545 A1    Jan. 7, 2016

Related U.S. Application Data

(60) Provisional application No. 61/586,261, filed on Jan. 13, 2012.

(51) Int. Cl.
*H01G 9/052*    (2006.01)
*H01G 9/00*    (2006.01)
(Continued)

(52) U.S. Cl.
CPC ............ *H01G 9/052* (2013.01); *H01G 9/0003* (2013.01); *H01G 9/0036* (2013.01); *H01G 9/012* (2013.01); *H01G 9/15* (2013.01); *H01G 9/18* (2013.01)

(58) Field of Classification Search
CPC ........ H01G 9/052; H01G 9/18; H01G 9/0036; H01G 9/012; H01G 9/15; H01G 9/0003
See application file for complete search history.

(56) References Cited

U.S. PATENT DOCUMENTS 3,345,545 A * 10/1967 Bourgault .............. H01G 9/052
361/529
4,814,946 A * 3/1989 Su .......................... H01H 85/06
337/297
(Continued)

FOREIGN PATENT DOCUMENTS

JP    2002008951 A * 1/2002

OTHER PUBLICATIONS

Search Report and Written Opinion for PCT/US2013/021160 dated Mar. 12, 2013, 9 pages.
(Continued)

*Primary Examiner* — David M Sinclair
(74) *Attorney, Agent, or Firm* — Dority & Manning, P.A.

(57) ABSTRACT

A solid electrolytic capacitor with an integrated fuse assembly is provided. The fuse can be secured in a recess formed in a face of the porous anode body of the capacitor. When the fuse is secured in the recess, the fuse can be substantially flush with the face of the porous anode body in which the recess is formed. Further, the equivalent series resistance (ESR) of the fuse is reduced because the length of the connection between the fuse and the porous anode body is reduced. Further, because the fuse is integrated into the porous anode body, the capacitor can be assembled onto a circuit board via standard pick and place equipment.

21 Claims, 2 Drawing Sheets

(51) Int. Cl.
*H01G 9/012* (2006.01)
*H01G 9/15* (2006.01)
*H01G 9/18* (2006.01)

(56) References Cited

U.S. PATENT DOCUMENTS

| | | | |
|---|---|---|---|
| 4,945,452 A | 7/1990 | Sturmer et al. | |
| 5,111,327 A | 5/1992 | Blohm et al. | |
| 5,155,462 A * | 10/1992 | Morrill, Jr. | H01G 9/0003 |
| | | | 337/297 |
| 5,168,434 A | 12/1992 | Kobayashi | |
| 5,177,674 A * | 1/1993 | Sugisaki | H01G 9/0003 |
| | | | 361/534 |
| 5,583,740 A | 12/1996 | Fujino | |
| 5,638,250 A * | 6/1997 | Oravala | H01G 2/14 |
| | | | 361/274.1 |
| 5,888,590 A | 3/1999 | Gerber et al. | |
| 6,197,252 B1 | 3/2001 | Bishop et al. | |
| 6,259,348 B1 | 7/2001 | Kuriyama | |
| 6,322,912 B1 | 11/2001 | Fife | |
| 6,391,275 B1 | 5/2002 | Fife | |
| 6,416,730 B1 | 7/2002 | Fife | |
| 6,527,937 B2 | 3/2003 | Fife | |
| 6,576,099 B2 | 6/2003 | Kimmel et al. | |
| 6,592,740 B2 | 7/2003 | Fife | |
| 6,635,729 B1 | 10/2003 | Groenendaal et al. | |
| 6,639,787 B2 | 10/2003 | Kimmel et al. | |
| 6,674,635 B1 | 1/2004 | Fife et al. | |
| 6,987,663 B2 | 1/2006 | Merker et al. | |
| 7,220,397 B2 | 5/2007 | Kimmel et al. | |
| 7,262,511 B2 | 8/2007 | Osako et al. | |
| 7,283,350 B2 | 10/2007 | Kataro et al. | |
| 7,341,705 B2 | 3/2008 | Schnitter | |
| 7,342,775 B2 * | 3/2008 | Hahn | H01G 9/012 |
| | | | 361/528 |
| 7,381,396 B2 | 6/2008 | Thomas et al. | |
| 7,419,926 B2 | 9/2008 | Schnitter et al. | |
| 8,313,538 B2 | 11/2012 | Merker et al. | |
| 2010/0246099 A1 | 9/2010 | Naka et al. | |

OTHER PUBLICATIONS

Letter dated Jul. 5, 2016 and Purchase Order from Kemet Electronic Components, 9 pages.

* cited by examiner

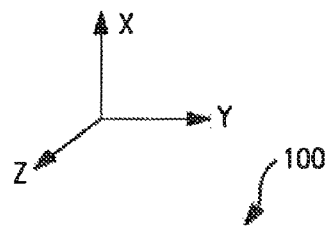
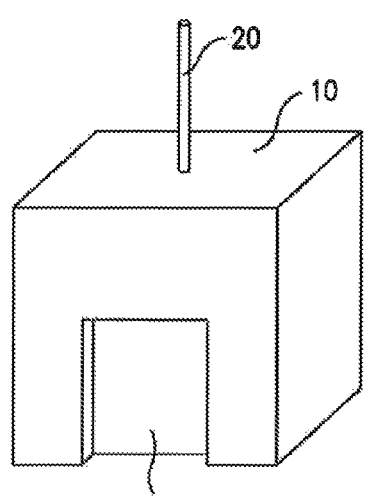
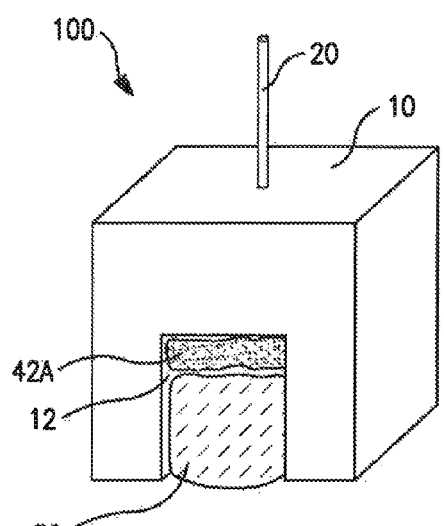
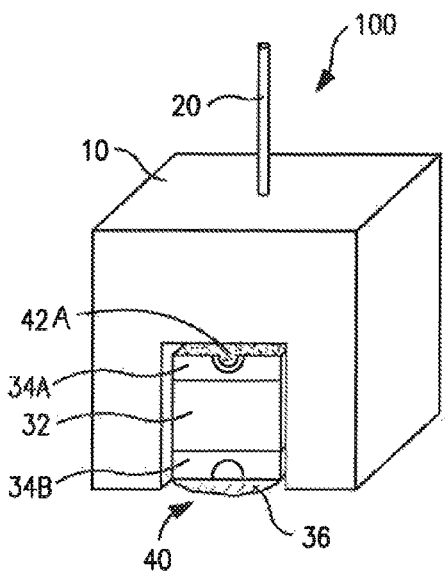
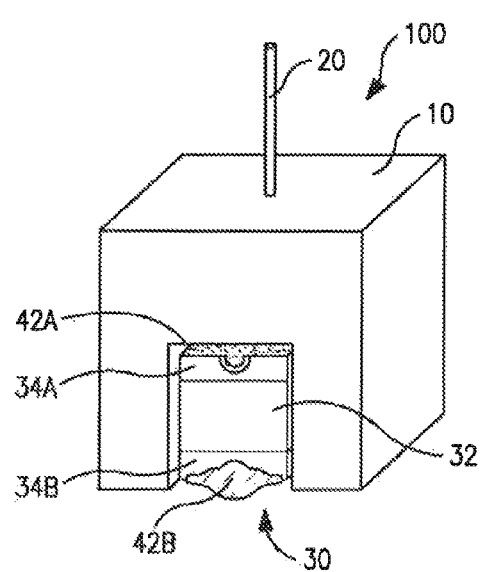
FIG. 1   FIG. 2   FIG. 3   FIG. 4

SOLID ELECTROLYTIC CAPACITOR WITH INTEGRATED FUSE ASSEMBLY

CROSS REFERENCE TO RELATED APPLICATIONS

The present application is the national stage entry of International Patent Application No. PCT/US2013/021160 having a filing date of Jan. 11, 2013, which claims the benefit of priority of U.S. Provisional Patent Application Ser. No. 61/586,261, filed Jan. 13, 2012, which are incorporated herein by reference for all purposes.

BACKGROUND INFORMATION

Solid electrolytic capacitors and, in particular, tantalum capacitors, are used to store energy. Tantalum capacitors are used in various applications because of their superior volumetric efficiency, one such application being pulsed radar systems. In such a system, high capacitance and low equivalent series resistance (ESR) allow for maximization of energy transfer during the "pulse" of the radar system.

Radar system designs incorporate many tantalum capacitors, which are electrically placed in parallel to achieve the required system capacitance value. Fuses are often placed in series with each capacitor in a radar system to prevent the capacitor from igniting upon exposure to excess current by disconnecting the capacitor from the circuit. If a tantalum capacitor fails due to an electrical short, the capacitor may ignite and destroy the printed circuit board that the capacitors are mounted on. This risk is particular to a radar system that has a large number of capacitors mounted in parallel.

In order to meet miniaturization requirements, some circuit designers have requested that tantalum capacitor manufacturers put a fuse into the capacitor in order to design out the discrete fuse. Tantalum capacitor manufacturers have done this to some extent, by incorporating fuse assemblies with the capacitor package. Generally, two packages are available.

The first package is a fused molded solid electrolyte tantalum capacitor, which has a capacitor body and a fuse assembly encapsulated in a plastic outer shell. The implementation of a fuse assembly requires an increase in the overall package size of approximately 35%. In a typical molded chip, the tantalum capacitor body is about 35% of the total volume of the molded package. Addition of the fuse assembly further reduces the percentage of capacitor body relative to package size, thus negatively affecting the advantage of volumetric efficiency. Furthermore, the fuse assembly is not integrated into the capacitor body and, therefore, a considerable ESR increase is realized because of the added connections and the length of those connections. In fact, the resistance of the fuse and its connections can add 100 mOhms of resistance to the finished capacitor.

The second package is a conformal-coated fused capacitor. In this package, the capacitor body is coated with a conformal material rather than with the plastic packaging of the molded device. The volumetric efficiency of the conformal-coated tantalum capacitor is much higher than that of the molded package because the capacitor body is 75% of the total package. If, however, a fuse assembly is added to the capacitor body, then it is added on the outside surface of the capacitor body and increases the overall package size. This method adds considerable ESR to the capacitor due to the necessary connections and may cause circuit assembly pick and place problems because of the protruding fuse.

What is needed therefore is a fused tantalum capacitor that integrates the fuse within the capacitor body so as to not affect the package size and to minimize the increase in ESR.

SUMMARY OF THE INVENTION

The invention can solve the above mentioned problems by integrating the fuse into the solid electrolytic capacitor body, which can reduce the electrical resistance of the fuse connection by making the shortest length of connection possible between the fuse and the capacitor body and increasing the surface area of the connections between the fuse and the capacitor body. Also, integrating the fuse into the capacitor body can permit the final capacitor package to be within the original dimensions and can also allow for standard circuit assembly pick and place equipment to be used.

The inventive device can be a conformal-coated tantalum capacitor with an integrated fuse assembly. The body of the capacitor can be a compacted-powder pellet. The pellet according to the invention can have a recess (e.g., notch), which can serve as a retainer for the fuse. A mechanical connector can connect the fuse to the capacitor body and can provide a high mechanical strength connection. The overall dimensions of the tantalum capacitor according to the invention, with the integrated fuse, can be comparable to those of conventional tantalum capacitors without a fuse assembly. The method of assembling the fuse into the capacitor body can provide for a mechanical connection that has a high mechanical strength. Furthermore, the method can minimize the electrical path between the fuse and the capacitor body, thereby reducing the electrical resistance and reducing the ESR by 50% relative to ESR levels in conventional tantalum capacitors.

Other features and aspects of the present invention are set forth in greater detail below.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which:

FIG. 1 illustrates the capacitor body with anode lead and pellet having a recess;

FIG. 2 illustrates the means for mechanically and electrically connecting the fuse to the capacitor body;

FIG. 3 illustrates the fuse assembled in the recess in the pellet;

FIG. 4 illustrates a second conductive connection of the fuse to the capacitor body;

Figure 5:
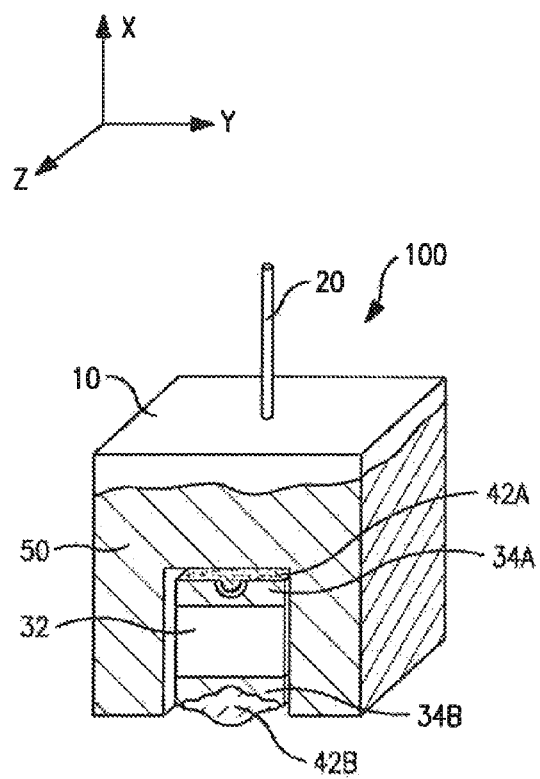
FIG. 5 illustrates the capacitor plating.

Repeat use of reference characters in the present specification and drawings is intended to represent the same or analogous features or elements of the present invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention.

Generally speaking, the present invention is directed to a solid electrolytic capacitor that includes a fuse. The fuse can prevent the capacitor form failing upon exposure to excess current by disconnecting the capacitor from a circuit in which it is utilized. The capacitor is configured so that the fuse can fit into a recess (e.g., notch) formed in one of the faces of the capacitor body, and the fuse can be substantially flush with the face of the capacitor body. Further, the fuse can be electrically connected to the cathode (i.e., solid electrolyte) of the capacitor body via one termination and the cathode termination via a second termination in such a manner that the second termination is isolated from the capacitor body.

In addition, because of the manner in which the fuse is electrically connected to the capacitor body, the capacitor of the present invention having an integrated fuse assembly exhibits an ESR that is at least about 100 mOhms lower than the ESR exhibited by conventional fused tantalum capacitors. For instance, the placement of the fuse into a recess in the capacitor body shortens the distance of between the fuse and the capacitor body, resulting in a shorter connection, which, in turn, reduces the ESR and leakage current of the integrated device. The resulting ESR can be about 300 milliohms (mΩ) or less, in some embodiments about 100 mΩ or less, in some embodiments from about 0.01 to about 50 mΩ, and in some embodiments from about 0.1 to about 20 mΩ, determined at a frequency of 100 kHz and a temperature of 23° C.±2° C. In addition, the leakage current, which generally refers to the current flowing from one conductor to an adjacent conductor through an insulator, can be maintained at relatively low levels. For example, the numerical value of the normalized leakage current of a capacitor of the present invention is, in some embodiments, less than about 0.1 μA/μF*V, in some embodiments less than about 0.01 μA/μF*V, and in some embodiments, less than about 0.001 μA/μF*V, wherein μA is microamps and uF*V is the product of the capacitance and the rated voltage. Further, because the fuse is integrated into the capacitor body, the overall size of the capacitor can be reduced, resulting in a capacitor that is more volumetrically efficient than other capacitor and fuse configurations.

The capacitor can generally include a capacitor body having an anode body, a dielectric layer, a cathode, and other optional layers. The capacitor can also include an anode lead, a fuse, a plating, anode and cathode terminations, and a conformal coating. Various embodiments of the present invention will now be described in more detail.

I. Capacitor Body a. Anode

The capacitor body generally includes a pellet formed in a powder compaction process. The pellet can be described as a porous anode body and serves as the anode for the capacitor. The anode body is formed from a valve metal composition. The specific charge of the composition may vary, such as from about 2,000 μF*V/g to about 250,000 μF*V/g, in some embodiments from about 3,000 μF*V/g to about 150,000 μF*V/g or more, and in some embodiments, from about 4,000 to about 75,000 μF*V/g. As is known in the art, the specific charge may be determined by multiplying capacitance by the anodizing voltage employed, and then dividing this product by the weight of the anodized electrode body.

The valve metal composition generally contains a valve metal (i.e., metal that is capable of oxidation) or valve metal-based compound, such as tantalum, niobium, aluminum, hafnium, titanium, alloys thereof, oxides thereof, nitrides thereof, and so forth. For example, the valve metal composition may contain an electrically conductive oxide of niobium, such as niobium oxide having an atomic ratio of niobium to oxygen of 1:1.0±1.0, in some embodiments 1:1.0±0.3, in some embodiments 1:1.0±0.1, and in some embodiments, 1:1.0±0.05. The niobium oxide may be $NbO_{0.7}$, $NbO_{1.0}$, $NbO_{1.1}$, and $NbO_2$. Examples of such valve metal oxides are described in U.S. Pat. No. 6,322,912 to Fife; U.S. Pat. No. 6,391,275 to Fife et al.; U.S. Pat. No. 6,416,730 to Fife et al.; U.S. Pat. No. 6,527,937 to Fife; U.S. Pat. No. 6,576,099 to Kimmel, et al.; U.S. Pat. No. 6,592,740 to Fife, et al.; and U.S. Pat. No. 6,639,787 to Kimmel, et al.; and U.S. Pat. No. 7,220,397 to Kimmel, et al., as well as U.S. Patent Application Publication Nos. 2005/0019581 to Schnitter; 2005/0103638 to Schnitter, et at; 2005/0013765 to Thomas, et al.

To form the anode, a powder of the valve metal composition is generally employed. The powder may contain particles any of a variety of shapes, such as nodular, angular, flake, etc., as well as mixtures thereof. Particularly suitable powders are tantalum powders available from Cabot Corp. (e.g., C255 flake powder, TU4D flake/nodular powder, etc.) and N.C. Starck (e.g., NH175 nodular powder). Although not required, the powder may be agglomerated using any technique known in the art, such as through heat treatment.

Certain additional components may also be included in the powder. For example, the powder may be optionally mixed with a binder and/or lubricant to ensure that the particles adequately adhere to each other when pressed to form the anode body. Suitable binders may include, for instance, poly(vinyl butyral); poly(vinyl acetate); poly(vinyl alcohol); poly(vinyl pyrrolidone); cellulosic polymers, such as carboxymethylcellulose, methyl cellulose, ethyl cellulose, hydroxyethyl cellulose, and methylhydroxyethyl cellulose; atactic polypropylene, polyethylene; polyethylene glycol (e.g., Carbowax from Dow Chemical Co.); polystyrene, poly(butadiene/styrene); polyamides, polyimides, and polyacrylamides, high molecular weight polyethers; copolymers of ethylene oxide and propylene oxide; fluoropolymers, such as polytetrafluoroethylene, polyvinylidene fluoride, and fluoro-olefin copolymers; acrylic polymers, such as sodium polyacrylate, poly(lower alkyl acrylates), poly (lower alkyl methacrylates) and copolymers of lower alkyl acrylates and methacrylates; and fatty acids and waxes, such as stearic and other soapy fatty acids, vegetable wax, microwaxes (purified paraffins), etc. The binder may be dissolved and dispersed in a solvent. Exemplary solvents may include water, alcohols, and so forth. When utilized, the percentage of binders and/or lubricants may vary from about 0.1% to about 8% by weight of the total mass. It should be understood, however, that binders and/or lubricants are not necessarily required in the present invention.

The resulting powder may then be compacted to form a pellet using any conventional powder press device. For example, a press mold may be employed that is a single station compaction press containing a die and one or multiple punches. Alternatively, anvil-type compaction press molds may be used that use only a die and single lower punch. Single station compaction press molds are available in several basic types, such as cam, toggle/knuckle and eccentric/crank presses with varying capabilities, such as single action, double action, floating die, movable platen, opposed ram, screw, impact, hot pressing, coining or sizing. The powder may be compacted around an anode lead (e.g., tantalum wire). It should be further appreciated that the anode lead may alternatively be attached (e.g., welded) to the anode body subsequent to pressing and/or sintering of the anode body. Although not required to be formed at this stage in the process, the recess of the present invention may be formed during pressing in a manner as would be known to those skilled in the art. For example, the press mold may contain an indentation that corresponds to the desired shape of the recess. In this manner, the powder is compressed around the indentation so that when removed from the mold, the resulting anode body contains a recess at the area where the indentation was located in the mold. It should also be understood that the recess can be formed after pressing by removing a portion of the pellet at the desired location where the recess is to be formed. A section of the pellet can be removed to form the recess by any suitable means, such as by cutting or grinding. Regardless of how the recess is formed (i.e., via the geometry of the press mold or via mechanical removal of a portion of the pellet), it can be defined by at least three walls or surfaces so that it can securely hold a fuse in place as is discussed in more detail below. For instance, as shown in FIG. 1, one wall can be formed that is parallel with but exists in a different plane from the faces of the capacitor body that determine the depth of the capacitor in the z-direction, and two walls can be formed that are parallel with but exist in separate planes from the faces of the capacitor body that determine the width of the capacitor body in the y-direction, where the two walls are also in different planes and directly oppose each other.

It is to be understood that after compaction, the resulting anode body can optionally be diced into any desired shape, such as a square, rectangle, circle, oval, cylinder, triangle, hexagon, octagon, heptagon, pentagon, etc.

The anode body may then be subjected to a heating step in which most, if not all, of any binder/lubricant are removed. For example, the anode body is typically heated by an oven that operates at a temperature of from about 150° C. to about 500° C. Alternatively, the binder/lubricant may also be removed by contacting the pellet with an aqueous solution, such as described in U.S. Pat. No. 6,197,252 to Bishop, et al. Thereafter, the anode body is sintered to form a porous, integral mass. The temperature, atmosphere, and time of the sintering may depend on a variety of factors, such as the type of anode, the size of the anode, etc. Typically, sintering occurs at a temperature of from about from about 800° C. to about 1900° C., in some embodiments from about 1000° C. to about 1500° C., and in some embodiments from about 1100° C. to about 1400° C., for a time of from about 5 minutes to about 100 minutes, and in some embodiments from about 30 minutes to about 60 minutes. If desired, sintering may occur in an atmosphere that limits the transfer of oxygen atoms to the anode. For example, sintering may occur in a reducing atmosphere, such as in a vacuum, inert gas, hydrogen, etc. The reducing atmosphere may be at a pressure of from about 10 Torr to about 2000 Torr, in some embodiments from about 100 Torr to about 1000 Torr, and in some embodiments from about 100 Torr to about 930 Torr. Mixtures of hydrogen and other gases (e.g., argon or nitrogen) may also be employed. Upon sintering, an anode body is thus formed that contains a recess for receiving a fuse in accordance with the present invention.

Whether the recess is formed during compaction or after compaction of the pellet and whether the anode body is diced after compaction or not, after sintering the recess has large enough dimensions such that it can hold a fuse, yet is not so large that it results in a significant reduction in the volume of the porous anode body, which can reduce the capacitance and the volumetric efficiency of the capacitor. For instance, as shown in FIG. 1, the ratio of the height of the capacitor body 10 (after compaction and any optional dicing) to the height of the recess 12 in the x-direction is from about 1.25 to about 5, such as from about 1.5 to about 4, such as from about 1.75 to about 3. Meanwhile, the ratio of the width of the capacitor body 10 to the width of the recess 12 in the y-direction is from about 1.25 to about 5, such as from about 1.5 to about 4, such as from about 1.75 to about 3. Further, the ratio of the depth of the capacitor body 10 to the depth of the recess 12 in the z-direction is from about 2 to about 10, such as from about 3 to about 8, such as from about 4 to about 6.

b. Dielectric

Once constructed, a dielectric layer may be formed by anodically oxidizing ("anodizing") the sintered anode body discussed above. This results in the formation of a dielectric layer that is formed over and/or within the pores of the anode body. For example, a tantalum (Ta) anode may be anodized to tantalum pentoxide ($Ta_2O_5$). Typically, anodization is performed by initially applying a solution to the anode, such as by dipping the anode into an electrolyte. A solvent is generally employed, such as water (e.g., deionized water). To enhance ionic conductivity, a compound may be employed that is capable of dissociating in the solvent to form ions. Examples of such compounds include, for instance, acids, such as described below with respect to the electrolyte. For example, an acid (e.g., phosphoric acid) may constitute from about 0.01 wt. % to about 5 wt. %, in some embodiments from about 0.05 wt. % to about 0.8 wt. %, and in some embodiments, from about 0.1 wt. % to about 0.5 wt. % of the anodizing solution. If desired, blends of acids may also be employed.

A current is passed through the anodizing solution to form the dielectric layer. The voltage applied during the dielectric layer formation process controls the thickness of the dielectric layer. For example, the power supply may be initially set up at a galvanostatic mode until the required voltage is reached. Thereafter, the power supply may be switched to a potentiostatic mode to ensure that the desired dielectric thickness is formed over the entire surface of the anode. Of course, other known methods may also be employed, such as pulse or step potentiostatic methods. The voltage at which anodic oxidation occurs typically ranges from about 4 to about 250 V, and in some embodiments, from about 9 to about 200 V, and in some embodiments, from about 20 to about 150 V. During oxidation, the anodizing solution can be kept at an elevated temperature, such as about 30° C. or more, in some embodiments from about 40° C. to about 200° C., and in some embodiments, from about 50° C. to about 100° C. Anodic oxidation can also be performed at ambient temperature or lower. The resulting dielectric layer may be formed on a surface of the anode and within its pores.

c. Solid Electrolyte

The capacitor body also contains a solid electrolyte that functions as the cathode for the capacitor. The solid electrolyte overlies the dielectric layer discussed above and can include, for example, manganese dioxide or a conductive polymer. A manganese dioxide solid electrolyte may, for instance, be formed by the pyrolytic decomposition of manganous nitrate ($Mn(NO_3)_2$). Such techniques are described, for instance, in U.S. Pat. No. 4,945,452 to Sturmer, et al., which is incorporated herein in its entirety by reference thereto for all purposes.

Alternatively, when the solid electrolyte contains a conductive polymer, the conductive polymer is typically π-conjugated and has electrical conductivity after oxidation or reduction, such as an electrical conductivity of at least about 1 μS/cm. Examples of such π-conjugated conductive polymers include, for instance, polyheterocycles (e.g., polypyrroles, polythiophenes, polyanilines, etc.), polyacetylenes, poly-p-phenylenes, polyphenolates, and so forth. In one embodiment, for example, the polymer is a substituted polythiophene, such as those having the following general structure:

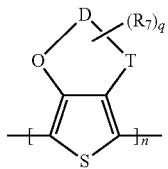

wherein,

T is O or S;

D is an optionally substituted $C_1$ to $C_5$ alkylene radical (e.g., methylene, ethylene, n-propylene, n-butylene, n-pentylene, etc.);

$R_7$ is a linear or branched, optionally substituted $C_1$ to $C_{18}$ alkyl radical (e.g., methyl, ethyl, n- or iso-propyl, n-, iso-, sec- or tert-butyl, n-pentyl, 1-methylbutyl, 2-methylbutyl, 3-methylbutyl, 1-ethylpropyl, 1,1-dimethylpropyl, 1,2-dimethylpropyl, 2,2-dimethylpropyl, n-hexyl, n-heptyl, n-octyl, 2-ethylhexyl, n-nonyl, n-decyl, n-undecyl, n-dodecyl, n-tridecyl, n-tetradecyl, n-hexadecyl, n-octadecyl, etc.); optionally substituted $C_5$ to $C_{12}$ cycloalkyl radical (e.g., cyclopentyl, cyclohexyl, cycloheptyl, cyclooctyl, cyclononyl, cyclodecyl, etc.); optionally substituted $C_6$ to $C_{14}$ aryl radical (e.g., phenyl, naphthyl, etc.); optionally substituted $C_7$ to $C_{18}$ aralkyl radical (e.g., benzyl, o-, m-, p-tolyl, 2,3-, 2,4-, 2,5-, 2-6, 3-4-, 3,5-xylyl, mesityl, etc.); optionally substituted $C_1$ to $C_4$ hydroxyalkyl radical, or hydroxyl radical; and q is an integer from 0 to 8, in some embodiments, from 0 to 2, and in one embodiment, 0; and n is from 2 to 5,000, in some embodiments from 4 to 2,000, and in some embodiments, from 5 to 1,000. Example of substituents for the radicals "D" or "$R_7$" include, for instance, alkyl, cycloalkyl, aryl, aralkyl, alkoxy, halogen, ether, thioether, disulphide, sulfoxide, sulfone, sulfonate, amino, aldehyde, keto, carboxylic acid ester, carboxylic acid, carbonate, carboxylate, cyano, alkylsilane and alkoxysilane groups, carboxylamide groups, and so forth.

Particularly suitable thiophene polymers are those in which "D" is an optionally substituted $C_2$ to $C_3$ alkylene radical. For instance, the polymer may be optionally substituted poly(3,4-ethylenedioxythiophene), which has the following general structure:

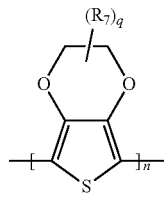

Methods for forming conductive polymers, such as described above, are well known in the art. For instance, U.S. Pat. No. 6,987,663 to Merker, et al., which is incorporated herein in its entirety by reference thereto for all purposes, describes various techniques for forming substituted polythiophenes from a monomeric precursor. The monomeric precursor may, for instance, have the following structure:

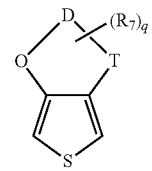

wherein,

T, D, $R_7$, and q are defined above. Particularly suitable thiophene monomers are those in which "D" is an optionally substituted $C_2$ to $C_3$ alkylene radical. For instance, optionally substituted 3,4-alkylenedioxythiophenes may be employed that have the general structure:

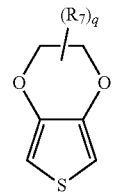

wherein, $R_7$ and q are as defined above. In one particular embodiment, "q" is 0. One commercially suitable example of 3,4-ethylenedioxythiophene is available from H.C. Starck GmbH under the designation Clevios™ M. Other suitable monomers are also described in U.S. Pat. No. 5,111,327 to Blohm, et al. and U.S. Pat. No. 6,635,729 to Groenendaal, et al., which are incorporated herein in their entirety by reference thereto for all purposes. Derivatives of these monomers may also be employed that are, for example, dimers or trimers of the above monomers. Higher molecular derivatives, i.e., tetramers, pentamers, etc. of the monomers are suitable for use in the present invention. The derivatives may be made up of identical or different monomer units and used in pure form and in a mixture with one another and/or with the monomers. Oxidized or reduced forms of these precursors may also be employed.

If a conductive polymer is employed as the solid electrolyte, the solid electrolyte can optionally include a plurality of pre-polymerized particles applied in the form of a dispersion. One benefit of employing a dispersion is that it may minimize the presence of ionic species (e.g., $Fe^{2+}$ or $Fe^{3+}$) produced during in situ polymerization, which can cause dielectric breakdown under high electric field due to ionic migration. Thus, by applying the conductive polymer as a dispersion rather through in situ polymerization, the resulting capacitor may exhibit a relatively high "breakdown voltage." To enable good impregnation of the anode body, the particles employed in the dispersion typically have a small size, such as an average size (e.g., diameter) of from about 1 to about 150 nanometers, in some embodiments from about 2 to about 50 nanometers, and in some embodiments from about 5 to about 40 nanometers. The diameter of the particles may be determined using known techniques, such as by ultracentrifuge, laser diffraction, etc. The shape of the particles may likewise vary. In one particular embodiment, for instance, the particles are spherical in shape. However, it should be understood that other shapes are also contemplated by the present invention, such as plates, rods, discs, bars, tubes, irregular shapes, etc. The concentration of the particles in the dispersion may vary depending on the desired viscosity of the dispersion and the particular manner in which the dispersion is to be applied to the capacitor. Typically, however, the particles constitute from about 0.1 to about 10 wt. %, in some embodiments from about 0.4 to about 5 wt. %, and in some embodiments from about 0.5 to about 4 wt. % of the dispersion.

The dispersion can also contain a counterion that enhances the stability of the particles. That is, the conductive polymer (e.g., polythiophene or derivative thereof) typically has a charge on the main polymer chain that is neutral or positive (cationic). Polythiophene derivatives, for instance, typically carry a positive charge in the main polymer chain. In some cases, the polymer may possess positive and negative charges in the structural unit, with the positive charge being located on the main chain and the negative charge optionally on the substituents of the radical "R", such as sulfonate or carboxylate groups. The positive charges of the main chain may be partially or wholly saturated with the optionally present anionic groups on the radicals "R." Viewed overall, the polythiophenes may, in these cases, be cationic, neutral or even anionic. Nevertheless, they are all regarded as cationic polythiophenes as the polythiophene main chain has a positive charge.

The counterion may be a monomeric or polymeric anion that counteracts the charge of the conductive polymer. Polymeric anions can, for example, be anions of polymeric carboxylic acids (e.g., polyacrylic acids, polymethacrylic acid, polymaleic acids, etc.); polymeric sulfonic acids (e.g., polystyrene sulfonic acids ("PSS"), polyvinyl sulfonic acids, etc.); and so forth. The acids may also be copolymers, such as copolymers of vinyl carboxylic and vinyl sulfonic acids with other polymerizable monomers, such as acrylic acid esters and styrene. Likewise, suitable monomeric anions include, for example, anions of $C_1$ to $C_{20}$ alkane sulfonic acids (e.g., dodecane sulfonic acid); aliphatic perfluorosulfonic acids (e.g., trifluoromethane sulfonic acid, perfluorobutane sulfonic acid or perfluorooctane sulfonic acid); aliphatic $C_1$ to $C_{20}$ carboxylic acids (e.g., 2-ethyl-hexylcarboxylic acid); aliphatic perfluorocarboxylic acids (e.g., trifluoroacetic acid or perfluorooctanoic acid); aromatic sulfonic acids optionally substituted by $C_1$ to $C_{20}$ alkyl groups (e.g., benzene sulfonic acid, o-toluene sulfonic acid, p-toluene sulfonic acid or dodecylbenzene sulfonic acid); cycloalkane sulfonic acids (e.g., camphor sulfonic acid or tetrafluoroborates, hexafluorophosphates, perchlorates, hexafluoroantimonates, hexafluoroarsenates or hexachloroantimonates); and so forth. Particularly suitable counteranions are polymeric anions, such as a polymeric carboxylic or sulfonic acid (e.g., polystyrene sulfonic acid ("PSS")). The molecular weight of such polymeric anions typically ranges from about 1,000 to about 2,000,000, and in some embodiments, from about 2,000 to about 500,000.

When employed, the weight ratio of such counterions to conductive polymers in the dispersion and in the resulting layer is typically from about 0.5:1 to about 50:1, in some embodiments from about 1:1 to about 30:1, and in some embodiments from about 2:1 to about 20:1. The weight of the electrically conductive polymers corresponds referred to the above-referenced weight ratios refers to the weighed-in portion of the monomers used, assuming that a complete conversion occurs during polymerization.

In addition to conductive polymer(s) and counterion(s), the dispersion may also contain one or more binders to further enhance the adhesive nature of the polymeric layer and also increase the stability of the particles within the dispersion. The binders may be organic in nature, such as polyvinyl alcohols, polyvinyl pyrrolidones, polyvinyl chlorides, polyvinyl acetates, polyvinyl butyrates, polyacrylic acid esters, polyacrylic acid amides, polymethacrylic acid esters, polymethacrylic acid amides, polyacrylonitriles, styrene/acrylic acid ester, vinyl acetate/acrylic acid ester and ethylene/vinyl acetate copolymers, polybutadienes, polyisoprenes, polystyrenes, polyethers, polyesters, polycarbonates, polyurethanes, polyamides, polyimides, polysulfones, melamine formaldehyde resins, epoxide resins, silicone resins or celluloses. Crosslinking agents may also be employed to enhance the adhesion capacity of the binders. Such crosslinking agents may include, for instance, melamine compounds, masked isocyanates or functional silanes, such as 3-glycidoxypropyltrialkoxysilane, tetraethoxysilane and tetraethoxysilane hydrolysate or crosslinkable polymers, such as polyurethanes, polyacrylates or polyolefins, and subsequent crosslinking.

Dispersion agents may also be employed to facilitate the formation of the solid electrolyte and the ability to apply it to the anode part. Suitable dispersion agents include solvents, such as aliphatic alcohols (e.g., methanol, ethanol, i-propanol and butanol), aliphatic ketones (e.g., acetone and methyl ethyl ketones), aliphatic carboxylic acid esters (e.g., ethyl acetate and butyl acetate), aromatic hydrocarbons (e.g., toluene and xylene), aliphatic hydrocarbons (e.g., hexane, heptane and cyclohexane), chlorinated hydrocarbons (e.g., dichloromethane and dichloroethane), aliphatic nitriles (e.g., acetonitrile), aliphatic sulfoxides and sulfones (e.g., dimethyl sulfoxide and sulfolane), aliphatic carboxylic acid amides (e.g., methylacetamide, dimethylacetamide and dimethylformamide), aliphatic and araliphatic ethers (e.g., diethylether and anisole), water, and mixtures of any of the foregoing solvents. A particularly suitable dispersion agent is water.

In addition to those mentioned above, still other ingredients may also be used in the dispersion. For example, conventional fillers may be used that have a size of from about 10 nanometers to about 100 micrometers, in some embodiments from about 50 nanometers to about 50 micrometers, and in some embodiments from about 100 nanometers to about 30 micrometers. Examples of such fillers include calcium carbonate, silicates, silica, calcium or barium sulfate, aluminum hydroxide, glass fibers or bulbs, wood flour, cellulose powder carbon black, electrically conductive polymers, etc. The fillers may be introduced into the dispersion in powder form, but may also be present in another form, such as fibers.

Surface-active substances may also be employed in the dispersion, such as ionic or non-ionic surfactants. Furthermore, adhesives may be employed, such as organofunctional silanes or their hydrolysates, for example 3-glycidoxypropyltrialkoxysilane, 3-aminopropyl-triethoxysilane, 3-mercaptopropyl-trimethoxysilane, 3-metacryloxypropyltrimethoxysilane, vinyltrimethoxysilane or octyltriethoxysilane. The dispersion may also contain additives that increase conductivity, such as ether group-containing compounds (e.g., tetrahydrofuran), lactone group-containing compounds (e.g., γ-butyrolactone or γ-valerolactone), amide or lactam group-containing compounds (e.g., caprolactam, N-methylcaprolactam, N,N-dimethylacetamide, N-methylacetamide, N,N-dimethylformamide (DMF), N-methylformamide, N-methylformanilide, N-methylpyrrolidone (NMP), N-octylpyrrolidone, or pyrrolidone), sulfones and sulfoxides (e.g., sulfolane (tetramethylenesulfone) or dimethylsulfoxide (DMSO)), sugar or sugar derivatives (e.g., saccharose, glucose, fructose, or lactose), sugar alcohols (e.g., sorbitol or mannitol), furan derivatives (e.g., 2-furancarboxylic acid or 3-furancarboxylic acid), an alcohols (e.g., ethylene glycol, glycerol, di- or triethylene glycol).

The polymeric dispersion may be applied using a variety of known techniques, such as by spin coating, impregnation, pouring, dropwise application, injection, spraying, doctor blading, brushing, printing (e.g., ink-jet, screen, or pad printing), or dipping. Although it may vary depending on the application technique employed, the viscosity of the dispersion is typically from about 0.1 to about 100,000 mPas (measured at a shear rate of 100 s$^{-1}$), in some embodiments from about 1 to about 10,000 mPas, in some embodiments from about 10 to about 1,500 mPas, and in some embodiments from about 100 to about 1000 mPas. Once applied, the layer may be dried and/or washed. One or more additional layers may also be formed in this manner to achieve the desired thickness. Typically, the total thickness of the layer(s) formed by this particle dispersion is from about 1 to about 50 μm, and in some embodiments, from about 5 to about 20 μm. The weight ratio of counterions to conductive polymers is likewise from about 0.5:1 to about 50:1, in some embodiments from about 1:1 to about 30:1, and in some embodiments from about 2:1 to about 20:1.

d. External Polymer Coating

Although not required, an external polymer coating may also be applied to the anode body which overlies the solid electrolyte. The external polymer coating can generally contain one or more layers formed from a dispersion of pre-polymerized conductive particles, such as described in more detail above. The external coating may be able to further penetrate into the edge region of the capacitor body to increase the adhesion to the dielectric and result in a more mechanically robust part, which may reduce equivalent series resistance and leakage current. Because it is generally intended to improve the degree of edge coverage rather to impregnate the interior of the anode body, the particles used in the external coating typically have a larger size than those employed in any optional dispersions of the solid electrolyte. For example, the ratio of the average size of the particles employed in the external polymer coating to the average size of the particles employed in any dispersion of the solid electrolyte is typically from about 1.5 to about 30, in some embodiments from about 2 to about 20, and in some embodiments from about 5 to about 15. For example, the particles employed in the dispersion of the external coating may have an average size of from about 50 to about 500 nanometers, in some embodiments from about 80 to about 250 nanometers, and in some embodiments from about 100 to about 200 nanometers.

If desired, a crosslinking agent may also be employed in the external polymer coating to enhance the degree of adhesion to the solid electrolyte. Typically, the crosslinking agent is applied prior to application of the dispersion used in the external coating. Suitable crosslinking agents are described, for instance, in U.S. Patent Publication No. 2007/0064376 to Merker, et al. and include, for instance, amines (e.g., diamines, triamines, oligomer amines, polyamines, etc.); polyvalent metal cations, such as salts or compounds of Mg, Al, Ca, Fe, Cr, Mn, Ba, Ti, Co, Ni, Cu, Ru, Ce or Zn, phosphonium compounds, sulfonium compounds, etc. Particularly suitable examples include, for instance, 1,4-diaminocyclohexane, 1,4-bis(amino-methyl) cyclohexane, ethylenediamine, 1,6-hexanediamine, 1,7-heptanediamine, 1,8-octanediamine, 1,9-nonanediamine, 1,10-decanediamine, 1,12-dodecanediamine, N,N-dimethylethylenediamine, N,N,N',N'-tetramethylethylenediamine, N,N,N',N'-tetramethyl-1,4-butanediamine, etc., as well as mixtures thereof.

The crosslinking agent is typically applied from a solution or dispersion whose pH is from 1 to 10, in some embodiments from 2 to 7, in some embodiments from 3 to 6, as determined at 25° C. Acidic compounds may be employed to help achieve the desired pH level. Examples of solvents or dispersants for the crosslinking agent include water or organic solvents, such as alcohols, ketones, carboxylic esters, etc. The crosslinking agent may be applied to the capacitor body by any known process, such as spin-coating, impregnation, casting, dropwise application, spray application, vapor deposition, sputtering, sublimation, knife-coating, painting or printing, for example inkjet, screen or pad printing. Once applied, the crosslinking agent may be dried prior to application of the polymer dispersion. This process may then be repeated until the desired thickness is achieved. For example, the total thickness of the entire external polymer coating, including the crosslinking agent and dispersion layers, may range from about 1 to about 50 μm, in some embodiments from about 2 to about 40 μm, and in some embodiments from about 5 to about 20 μm.

e. Other Layers of the Capacitor Body

If desired, the capacitor may also contain other layers as is known in the art. For example, a protective coating may optionally be formed between the dielectric and solid electrolyte, such as one made of a relatively insulative resinous material (natural or synthetic). Such materials may have a specific resistivity of greater than about 10 Ω·cm, in some embodiments greater than about 100, in some embodiments greater than about 1,000 Ω·cm, in some embodiments greater than about 1×10$^5$ Ω·cm, and in some embodiments, greater than about 1×10$^{10}$ Ω·cm. Some resinous materials that may be utilized in the present invention include, but are not limited to, polyurethane, polystyrene, esters of unsaturated or saturated fatty acids (e.g., glycerides), and so forth. For instance, suitable esters of fatty acids include, but are not limited to, esters of lauric acid, myristic acid, palmitic acid, stearic acid, eleostearic acid, oleic acid, linoleic acid, linolenic acid, aleuritic acid, shellolic acid, and so forth. These esters of fatty acids have been found particularly useful when used in relatively complex combinations to form a "drying oil", which allows the resulting film to rapidly polymerize into a stable layer. Such drying oils may include mono-, di-, and/or tri-glycerides, which have a glycerol backbone with one, two, and three, respectively, fatty acyl residues that are esterified. For instance, some suitable drying oils that may be used include, but are not limited to, olive oil, linseed oil, castor oil, tung oil, soybean oil, and shellac. These and other protective coating materials are described in more detail U.S. Pat. No. 6,674,635 to Fife, et al., which is incorporated herein in its entirety by reference thereto for all purposes.

If desired, the capacitor body may also be applied with a carbon layer (e.g., graphite) and silver layer, respectively. The silver coating may, for instance, act as a solderable conductor, contact layer, and/or charge collector for the capacitor and the carbon coating may limit contact of the silver coating with the solid electrolyte. Such coatings may cover some or all of the solid electrolyte.

II. Anode Lead

Typically, the capacitor of the present invention also contains an anode lead that helps connect the anode of the capacitor body to the terminations of the resulting solid electrolytic capacitor, which are discussed in more detail below. The anode lead may be formed from any electrically conductive material, such as tantalum, niobium, nickel, aluminum, hafnium, titanium, etc., as well as oxides and/or nitrides of thereof. The anode lead can be in the form of a wire, a tape, etc. In the embodiment of FIGS. 1-6, for example, an anode lead wire 20 extends longitudinally from the capacitor body 10 in the x-direction. Electrical contact with the anode of the capacitor body 10 may be accomplished in a variety of ways, such as by coupling the lead wire 20 to the anode body using resistance or laser welding. Alternatively, the lead wire 20 may be embedded in the anode body during the formation of the anode body (e.g., prior to sintering) as discussed above. Further, as shown in FIG. 7, the anode lead wire 20 may be trimmed to allow for the placement of an anode termination 22 against the surface of the capacitor body 10, where at the surface of the capacitor body 10, the anode lead 20 is in electrical contact with the anode termination 22.

III. Fuse Assembly

Generally, the solid electrolytic capacitor of the present invention also includes a fuse assembly, which can include a fuse and an insulating material. The fuse assembly can also include a first mass of conductive material and a second mass of conductive material, although it is to be understood that the first mass of conductive material and second mass of conductive material are not necessarily required.

The fuse in the fuse assembly can be designed to disconnect the capacitor from a circuit when a current is reached that is about 250% of the rated current of the capacitor to prevent the capacitor from becoming damaged. The fuse can be any suitable fuse known to a person skilled in the art. In order to ensure that the fuse can be substantially flush with the capacitor body when placed in the recess in the capacitor body, for instance, the fuse can be a thin film fuse that includes a thin film of appropriate metal. For example, the thin film fuse can include a track of nickel or copper. The thin film fuse can further include a dielectric substrate that can include ceramic, glass, or glass ceramic. The thin film fuse can also include a thin layer of tantalum below the fuse metal to promote adherence between dielectric substrate and the metal. Additionally, the thin film fuse can include a passivation layer protecting the fuse metal. In one embodiment, the passivation layer can include silicon oxynitride. A layer of tantalum can also be provided over the fuse metal and below the passivation layer to promote adhesion of the passivation layer to the fuse metal. The thin film fuse can further include an encapsulation layer of polyimide.

In another embodiment, the fuse can be a resettable fuse such as a positive temperature coefficient fuse. The resettable fuse can include a positive temperature coefficient ("PTC") material that exhibits electrical resistivity that increases with increasing temperature. As the PTC material is heated due to electrical current, negative feedback results from increased resistance, which in turn results from the increased material temperature. Polymer-based PTC materials (also known as polymer positive coefficient ("PPTC") materials), for instance, may be employed in the fuse. Such materials contain an electrically conductive filler contained within a polymer matrix. The polymer matrix is generally capable of exhibiting two phases. The first phase is a crystalline or semi-crystalline state in which the molecules form long chains and arrange in a regular structure. In this "crystalline" phase, the electrically conductive filler is packed into the crystalline boundaries and forms many conductive paths. At a predetermined temperature correlated with a current overload, this structure transitions by expanding to an amorphous phase that breaks the chain of conductive pathways between the filler. Namely, when current flows through the fuse, it is heated and reaches a constant temperature just above its trip temperature (e.g., about 120° C.). Further breakdown of the capacitor or an additional increase in the current will heat the fuse more, causing it to open and limit the current back to the value, which corresponds to the fuse trip temperature. If the capacitor remains failed and the power is on, the fuse will keep a constant temperature and limit current to the constant value. Although the capacitor may still be able to operate, its leakage current will be higher. The polymer matrix can cool down and return to its normal crystalline state when the source reduces its voltage or is turned off, or when the capacitor heals itself through a self-healing mechanism, thus allowing the filler to again touch and form conductive pathways, upon which the circuit closes and the capacitor may function properly. Thus, the PPTC material is advantageously self-resetting and does not have to be replaced. Examples of such PPTC fuses are commercially available under the designations POLYSWITCH™ (Tyco Electronics), EVERFUSE™ (Polytronics), POLYFUSE™ (Littelfuse) and MULTIFUSE™ (Bourns).

Whether a thin film fuse, a resettable fuse, or any other suitable fuse is utilized in the fuse assembly, the fuse can include a first fuse termination for electrically connecting the fuse to the solid electrolyte of the capacitor body and a second fuse termination for electrically connecting the fuse to a cathode termination, which is discussed in more detail below.

As briefly discussed above, the fuse can be placed inside the recess in the capacitor body such that the fuse is substantially flush with the face of the capacitor body in which the recess is formed. The recess can be defined by at least three walls or surfaces which can hold the fuse. For instance, as shown in FIG. 1, one wall can be formed that is in parallel with but exists in a different plane from the faces of the capacitor body that determine the depth of the capacitor in the z-direction, and two walls can be formed that are parallel with but exist in separate planes from the faces of the capacitor body that determine the width of the capacitor body in the y-direction, where the two walls are also in different planes and directly oppose each other.

The first fuse termination may be electrically connected to the cathode (i.e., solid electrolyte) of the capacitor body and the second fuse termination may be connected to the cathode termination, which is described in more detail below), using any technique known in the art. In one embodiment, as shown in FIG. 1, an insulating material can be applied to the wall of the recess that is in parallel with but exists in a different plane from the faces of the capacitor body that determine the depth of the capacitor in the z-direction and to the two walls that are parallel with but exist in separate planes from the faces of the capacitor body that determine the width of the capacitor body in the y-direction. The insulating material, however, is not applied to the entire portion of the recess with which the first fuse termination comes into contact, although a small amount of insulating material may come into contact with the portion of the recess in which the first fuse termination will rest, so that an electrical connection can be formed between the first fuse termination and the solid electrolyte of the capacitor body. Meanwhile, the insulating material is applied to the portion of the recess in which the second fuse termination will rest to sufficiently electrically isolate the second fuse termination from the capacitor body once the fuse is placed in the recess. It should be noted that the insulating material can be any suitable insulating material, but in one particular embodiment, the insulating material is an insulating adhesive such as an epoxy adhesive. Further, although the insulating adhesive does not contact the entire portion of the recess in which the first fuse termination rests, because the insulating adhesive still covers a substantial portion of the surface area of the fuse, the bond between the capacitor body and the fuse can exhibit high mechanical strength.

To form an electrical connection between the first fuse termination and the capacitor body, a first mass of conductive material, such as a conductive adhesive, can be applied to the portion of the recess in which the first fuse termination will rest. The conductive adhesive may include, for instance, conductive metal particles contained with a resin composition. The metal particles may be silver, copper, gold, platinum, nickel, zinc, bismuth, etc. The resin composition may include a thermoset resin (e.g., epoxy resin), curing agent (e.g., acid anhydride), and coupling agent (e.g., silane coupling agents). Suitable conductive adhesives may be described in U.S. Patent Application Publication No. 2006/0038304 to Osako, et al., which is incorporated herein in its entirety by reference thereto for all purposes. In one particular embodiment, the conductive adhesive includes a mass of conductive silver. Any of a variety of techniques may be used to apply the conductive adhesive to the portion of the recess in which the first fuse termination will rest. Printing techniques, for instance, may be employed due to their practical and cost-saving benefits.

Next, the fuse can then be placed in the recess so that the first fuse termination is in electrical contact with the first mass of conductive material and the second fuse termination is in contact with the insulating material. After the fuse is secured in the recess, a second mass of conductive material can be applied over the second fuse termination to facilitate the forming of an electrical connection between the second fuse termination and the cathode termination, which is discussed in more detail below. The second mass of conductive material can include any of the conductive adhesives discussed above in reference to the electrical connection between the first fuse termination and the solid electrolyte of the capacitor body.

Applying the first and second masses of conductive material in the manner discussed above can minimize the electrical path between the capacitor body and the first and second fuse terminations and can also maximize the contact area with the first and second fuse terminations, which minimizes the electrical resistance between the fuse terminations and the capacitor body. This partial assembly of the fused capacitor can then be subjected to curing temperatures for a period of time, to cure the conductive and adhesive materials.

Although the electrical connections between the first fuse termination and solid electrolyte and the electrical connection between the second fuse termination and the cathode termination are described above as including the use of a mass of conductive material such as a conductive adhesive, it is to be understood that the electrical connections can be made using any technique known in the art, such as via mechanical welding, laser welding, etc. For example, the second fuse termination can be welded to the cathode termination using a laser.

IV. Plating

After the fuse has been secured in the recess, the capacitor body and fuse assembly may also be applied with a plating that can be applied in an electroless, electrolytic, or any other suitable process. The plating can be a metal plating such as nickel, aluminum, silver, copper, gold, platinum, tin, ruthenium, etc. In one particular embodiment, the plating is a nickel plating. The plating can protect the capacitor body from exposure to cleaning solutions and can also protect the ingress of external contaminants into the capacitor. Further, the plating can provide additional strength to the capacitor so that it can maintain its integrity during thermal shock.

V. Terminations

As briefly mentioned above, the capacitor may also be provided with terminations, particularly when employed in surface mounting applications. For example, the capacitor may contain an anode termination to which the anode lead is electrically connected and a cathode termination to which the cathode of the capacitor body is electrically connected. Any conductive material may be employed to form the terminations, such as a conductive metal (e.g., copper, nickel, silver, nickel, zinc, tin, palladium, lead, copper, aluminum, molybdenum, titanium, iron, zirconium, magnesium, and alloys thereof). Particularly suitable conductive metals include, for instance, copper, copper alloys (e.g., copper-zirconium, copper-magnesium, copper-zinc, or copper-iron), nickel, and nickel alloys (e.g., nickel-iron). The thickness of the terminations is generally selected to minimize the thickness of the capacitor. For instance, the thickness of the terminations may range from about 0.05 to about 1 millimeter, in some embodiments from about 0.05 to about 0.5 millimeters, and from about 0.07 to about 0.2 millimeters. One exemplary conductive material is a copper-iron alloy metal plate available from Wieland (Germany). If desired, the surface of the terminations may be electroplated with nickel, silver, gold, tin, etc. as is known in the art to ensure that the final part is mountable to the circuit board. In one particular embodiment, both surfaces of the terminations are plated with nickel and silver flashes, respectively, while the mounting surface is also plated with a tin solder layer.

The terminations may be connected to the capacitor body using any technique known in the art such as via mechanical welding, laser welding, conductive adhesives, etc. In one embodiment, for example, to attach the capacitor body to the cathode termination, a conductive adhesive may initially be applied to a surface of the cathode termination. The conductive adhesive may include and of the conductive adhesives discussed above in reference the conductive adhesive that can be utilized in the fuse assembly. When a conductive adhesive, such as the second mass of conductive material discussed above, is utilized to electrically connect the fuse to the cathode termination, it is to be understood that a cut line 44, as shown in FIG. 6, can be made at the end of the capacitor body where the second fuse termination is located in the recess in order to expose the conductive adhesive at the fuse surface. This permits a sufficient electrical connection to be formed between the cathode termination 38 and the cathode end of the capacitor body via second mass of conductive material 42B.

Meanwhile, in one embodiment, the anode termination can also be electrically connected to the anode lead using any technique known in the art, such as via mechanical welding, laser welding, conductive adhesives, etc. For instance, when a conductive adhesive is used, the conductive adhesive may include and of the conductive adhesives discussed above in reference the conductive adhesive that can be utilized in the fuse assembly. Alternatively, the anode lead may be welded to the anode termination using a laser. Lasers generally contain resonators that include a laser medium capable of releasing photons by stimulated emission and an energy source that excites the elements of the laser medium. One type of suitable laser is one in which the laser medium consist of an aluminum and yttrium garnet (YAG), doped with neodymium (Nd). The excited particles are neodymium ions Nd$^{3+}$. The energy source may provide continuous energy to the laser medium to emit a continuous laser beam or energy discharges to emit a pulsed laser beam. Then, upon electrically connecting the anode lead to the anode termination, the conductive adhesive that can be used to connect the cathode termination may then be cured. Regardless of whether the capacitor body is conformally coated with an insulative resin before or after connecting the capacitor body to the anode and cathode terminations, the conformal coating is applied in such a manner so that at least a portion of the anode and cathode terminations are exposed, as is discussed in more detail below. Further, the coating is applied in such a manner so that a sufficient electrical connection can be formed between the anode termination and anode lead and the cathode termination and the second mass of conductive material at the second fuse termination.

VI. Conformal Coating

Additionally, a conformal coating that includes an insulating material can also be provided around the capacitor body, the portion of the anode lead that extends beyond a surface of the capacitor body, and the fuse so long as at least part of the second mass of conductive material located at the second fuse termination and part of the anode lead remain exposed so that a sufficient electrical connection can be formed with a cathode termination and an anode termination, respectively, as is discussed above. In other words, the insulating material generally does not coat the entire surface of the anode lead or the cathode end of the capacitor body. The insulating resin can be any suitable encapsulating resin such as a silica resin or an epoxy resin. In other embodiments, it is to be understood that the capacitor may be formed so that the conformal coating only surrounds the capacitor body such that the fuse is not coated. The application of a conformal coating to a capacitor body is described in detail in U.S. Pat. No. 5,888,590 to Gerber, et al. and U.S. Pat. No. 7,283,350 to Katraro, et al.

The present invention including the components discussed in detail above may be better understood by reference to the figures. FIGS. 1-7 illustrate various stages of manufacture of a solid conformal-coated tantalum capacitor 100 according to the invention having an integrated fuse assembly 30. As shown in FIG. 7, the capacitor 100 includes a capacitor body 10 having a recess 12 (see FIG. 1), a tantalum wire 20, a fuse assembly 30, an anode termination 22, and an opposing cathode termination 38. The tantalum wire 20 can extend from a surface of the capacitor body 10 in the x-direction (see FIG. 6) but can be trimmed or cut as shown in FIG. 7 such that the anode termination 22 can be in sufficient electrical contact with the tantalum wire 20 yet can rest against the face of the capacitor body 10 where the tantalum wire 20 is embedded or attached. Meanwhile, the cathode termination 38 can be in electrical contact with a solid electrolyte layer (not shown) of the capacitor body 10 via the fuse assembly 30, which is discussed in more detail below.

The fuse assembly 30 includes a fuse 32, a first fuse termination 34A, and a second fuse termination 34B. The first fuse termination 34A is positioned at an opposing end of the fuse 32 from the second fuse termination 34B, which is located at end of the capacitor body 10 where the cathode termination 38 is electrically connected. The fuse assembly 30 is connected to the cathode termination 38 as well as the capacitor body 10 via a fuse connection assembly 40. The fuse connection assembly 40 further includes an insulating adhesive material 36 (see FIG. 1), a first mass of conductive material 42A, and a second mass of conductive material 42B. As shown, the fuse assembly 30 is secured in the recess 12 (see FIG. 1) of the capacitor body 10 such that the fuse assembly 30 is substantially flush with the face of the capacitor body 10 in which the recess 12 is formed.

Figure 6:
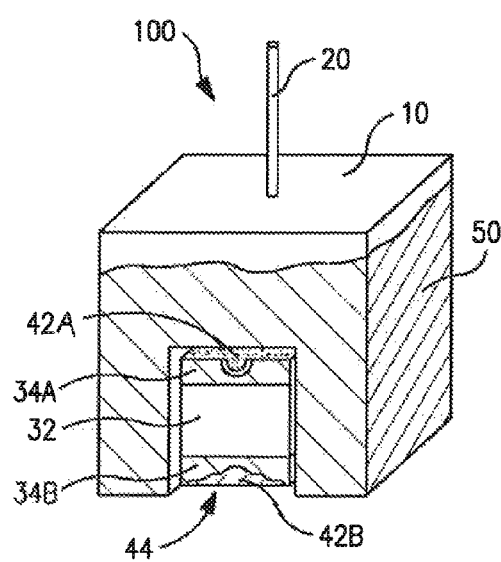
FIG. 6 illustrates the cut line for providing a connection of the fuse to the cathode of the capacitor.
Figure 7:
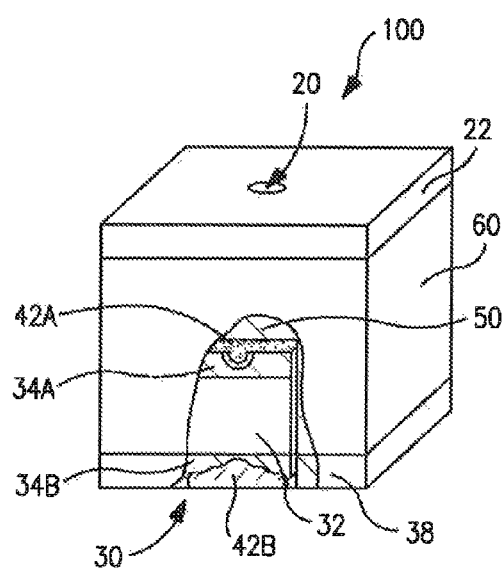
FIG. 7 is a partial cut-away Illustration of the conformal-coated solid electrolytic capacitor according to the present invention.

As is further shown in FIGS. 5-7, the tantalum capacitor 100 also includes a metal plating 50 that overlies at least a portion of the capacitor body 10 and fuse assembly 30. In some embodiments, the metal plating 50 can be a nickel plating. The tantalum capacitor 100 also includes a conformal coating 60 that is applied over the capacitor body 10 and fuse assembly 30. As discussed above, the conformal coating 60 can be an epoxy coating that encases the capacitor body 10 and the fuse assembly 30. The outer dimensions of the capacitor 100 are comparable to that of a conventional capacitor body, but, as shown, the tantalum capacitor 100 also includes the integrated fuse assembly 30. The overall construction of the tantalum capacitor 100 as shown in FIG. 7 provides a device that has ESR levels that are 100 mOhms lower than conventional fused tantalum capacitors. This is a 50% reduction in ESR.

The process by which the tantalum capacitor 100 is formed is now described. First, FIG. 1 illustrates the capacitor body 10 with the tantalum wire 20. The capacitor body 10 is a pellet formed in a powder compaction process, such as the compaction process discussed above. As shown, a recess 12 is formed in the capacitor body 10. This recess 12 provides space to accommodate the fuse assembly 30, without extending beyond the perimeter of the capacitor body 10.

FIGS. 2-3 illustrate an initial step in assembling the fuse 32 into the capacitor body 10. An adhesive material 36, such as epoxy adhesive, is applied to a portion of the walls of the recess 12. The fuse 32 is placed into the recess 12, pressing it against the adhesive material 36, so that the adhesive material is forced around several of the edges of the fuse 32 that face the walls of the recess 12. Because the adhesive material 36 covers such a large surface area of the fuse 32, the bond with the fuse exhibits high mechanical strength. The adhesive material is indicated by sleet lines in FIGS. 2 and 3, for illustration purposes only. As shown, the fuse 32 has two terminations 34A and 34B, and the adhesive material 36 serves to electrically isolate the termination 34B of the fuse 32 from the capacitor body 10.

FIGS. 2-6 illustrate details of the fuse connection assembly 40. Before the fuse 32 is placed in the recess 12, a first mass of conductive material 42A is applied to an upper section of the recess 12 as shown in FIG. 2. The conductive material is indicated by stippling, merely for illustration purposes. In the embodiment shown, the conductive material 42A is a mass of conductive silver, as shown in FIG. 2. After the fuse 32 is assembled in the recess 12, the first mass of conductive material 42A is in contact with the several sides of the first fuse termination 34A and the capacitor body 10. A second mass of the conductive material 42B is then applied on top of the adhesive material 36 and on the second fuse termination 34B. Applying the first mass of conductive material 42A and the second mass of conductive material 42B in this way minimizes the electrical path between the capacitor body 10 and the respective furs terminations 34A and 34B and maximizes the contact area with the fuse terminations, which minimizes the electrical resistance between the fuse terminations and the capacitor body. This partial assembly of the fused capacitor 100 is then subjected to curing temperatures for a period of time, to cure the conductive and adhesive materials. As shown in FIG. 5, the fused capacitor is then coated with a plating 50 that is applied in an electroless, electrolytic, or other suitable process. In this embodiment, the coating 50 is a nickel plating. The plating 50 is indicated with diagonal lines, for illustration purposes only. Meanwhile, FIG. 6 indicates a cut line 44, which exposes the second mass of conductive material 42B, in order to provide a sufficient electrical connection to the cathode termination 38 of the capacitor body 10.

The method of assembly of the tantalum capacitor 100 described above is provided for purposes of illustration only. Other suitable assembly methods may be used to assemble the component. For example, rather than assembling the fuse in the recess prior to conformal coating, a second embodiment of the tantalum capacitor 100A may be manufactured in the following manner. The adhesive material is applied to the recessed area as described above and then cured. The conformal coating is then applied to the capacitor, including the recess. The anode and cathode terminations are then applied to the capacitor body and the conformal coating cut through, to expose adhesive material. The conductive material is then applied to the exposed area at the top of the recess and then to the termination at the bottom of the recess. The fuse is then placed in the recess. The assembly then undergoes curing and is finally nickel plated. In this embodiment, the overall size of the tantalum capacitor is the same as that of the embodiment depicted in FIG. 7, but the conformal coating does not encapsulate the fuse assembly.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A solid tantalum capacitor comprising:
   a capacitor body having a tantalum wire lead and a recess;
   a fuse assembly that includes a fuse with two terminations and an adhesive material for securing the fuse in the recess;
   a connection assembly that includes an electrically conductive material that connects one of the fuse terminations to the capacitor body;
   a plating that coats the terminations and conductive material; and
   a conformal coating that encases at least the capacitor body.

2. The solid electrolytic capacitor of claim 1, further comprising an anode termination that is electrically connected to the tantalum wire lead and a cathode termination that is electrically connected to the electrically conductive material.

3. The solid electrolytic capacitor of claim 1, wherein the adhesive material is insulative.

4. The solid electrolytic capacitor claim 1, wherein the conductive material comprises a mass of conductive silver.

5. The solid electrolytic capacitor of claim 1, wherein the plating comprises nickel.

6. The solid electrolytic capacitor of claim 1, wherein the capacitor body comprises a sintered, porous anode body, a dielectric layer overlying at least a portion of the porous anode body, and a cathode overlying at least a portion of the dielectric layer, the cathode including a solid electrolyte.

7. The solid electrolytic capacitor of claim 6, wherein the solid electrolyte comprises a conductive polymer, wherein the conductive polymer comprises a plurality of pre-polymerized conductive polymer particles applied as a dispersion.

8. The solid electrolytic capacitor of claim 6, wherein the solid electrolyte comprises a conductive polymer, wherein the conductive polymer is applied through in situ polymerization.

9. The solid electrolytic capacitor of claim 6, wherein the solid electrolyte includes manganese dioxide.

10. The solid electrolytic capacitor of claim 6, wherein the capacitor body further comprises an external polymer coating that overlies the solid electrolyte, wherein the external polymer coating contains a plurality of pre-polymerized conductive polymer particles.

11. The solid electrolytic capacitor of claim 1, wherein the capacitor body has a height, a width, and a depth and the recess has a height, a width, and a depth, wherein the ratio of the height of the porous anode body to the height of the recess is from about 1.25 to about 5, the ratio of the width of capacitor body to the width of the recess is from about 1.25 to about 5, or the ratio of the depth of the capacitor body to the depth of the recess is from about 2 to about 10.

12. A solid electrolytic capacitor comprising:
    a capacitor body that comprises a sintered, porous anode body, a dielectric layer overlying at least a portion of the porous anode body, and a cathode overlying at least a portion of the dielectric layer, the cathode including a solid electrolyte, wherein a recess is formed in a face of the capacitor body;
    an anode lead; and
    a fuse, wherein the fuse is secured in the recess such that the fuse is substantially flush with the face of the capacitor body in which the recess is formed, wherein the capacitor body and fuse are coated in a nickel plating.

13. The solid electrolytic capacitor of claim 12, wherein the porous anode body includes tantalum, niobium, or an electrically conductive oxide thereof.

14. The solid electrolytic capacitor of claim 12, wherein an insulating adhesive material secures the fuse in the recess.

15. The solid electrolytic capacitor of claim 12, wherein the fuse has a first termination and second termination.

16. The solid electrolytic capacitor of claim 15, wherein a first mass of electrically conductive material electrically connects the first termination to the capacitor body.

17. The solid electrolytic capacitor of claim 15, wherein the second termination is isolated from the capacitor body by an insulating adhesive material.

18. The solid electrolytic capacitor of claim 15, wherein a second mass of electrically conductive material electrically connects the second fuse termination to a cathode termination.

19. The solid electrolytic capacitor of claim 12, wherein the capacitor body and the fuse are coated with a conformal coating.

20. The solid electrolytic capacitor of claim 12, further comprising an anode termination that is electrically connected to the anode lead.

21. A method for forming a solid electrolytic capacitor having an integrated fuse, the method comprising:
    embedding an anode lead within a powder formed from a valve metal composition;
    compacting the powder around the anode lead to form a pellet, wherein a portion of the anode lead extends from a surface of the pellet and a recess is formed in a face of the pellet;
    sintering the pellet to form a porous anode body;
    anodically oxidizing the sintered anode body to form a dielectric layer;

applying a solid electrolyte to the anodically oxidized sintered anode body to form a capacitor body;

securing a fuse in the recess, wherein the fuse is substantially flush with the face in which the recess is formed;

electrically connecting the fuse to the capacitor body using an electrically conductive material;

applying a plating over the solid electrolyte and fuse; and applying a conformal coating over the plating.

* * * * *